Feb. 15, 1938.    T. McLEOD    2,108,498
MARINE STEERING GEAR MOTOR
Filed April 10, 1936    2 Sheets-Sheet 1
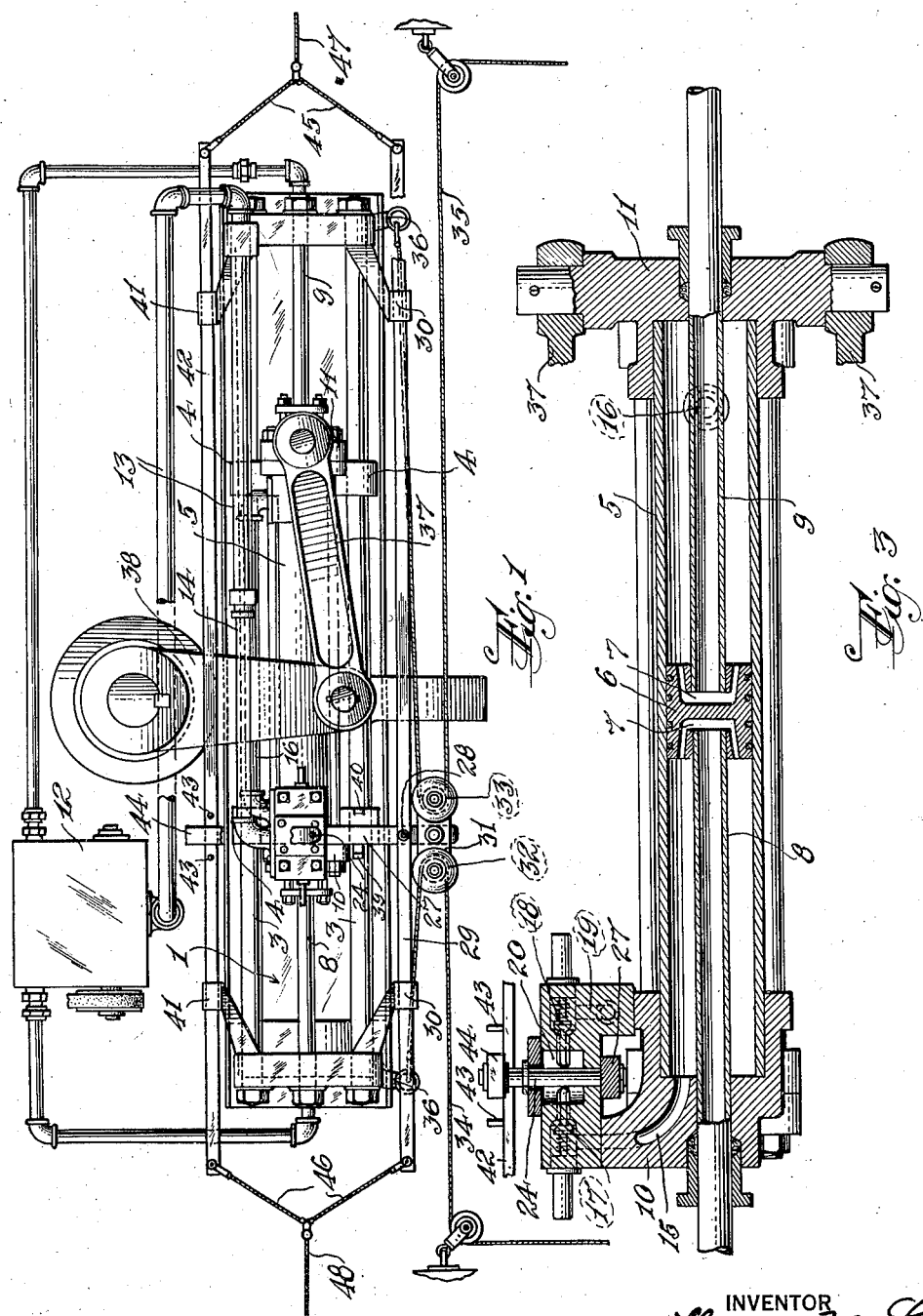

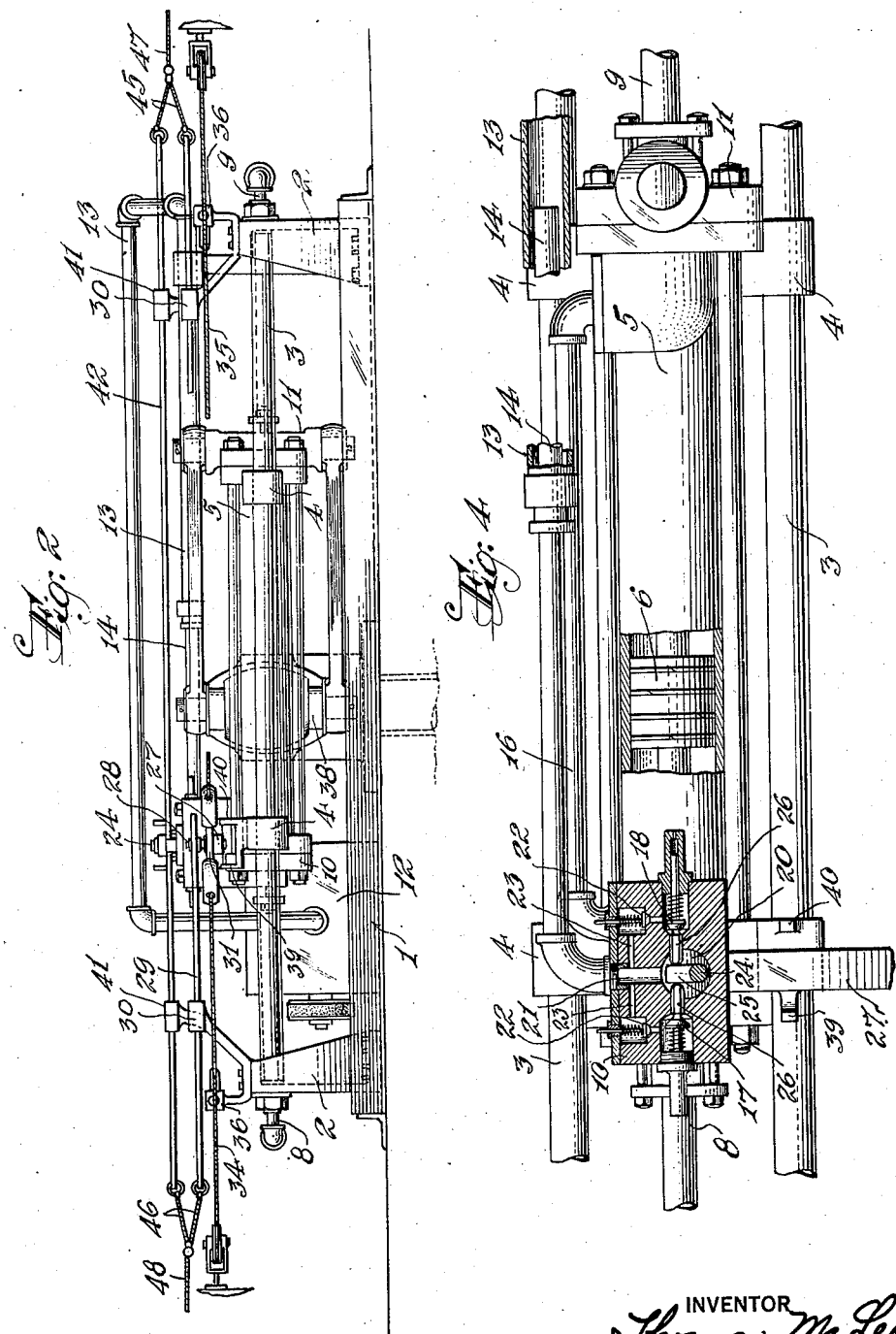

Patented Feb. 15, 1938

2,108,498

UNITED STATES PATENT OFFICE 2,108,498

MARINE STEERING GEAR MOTOR

Thomas McLeod, Elizabeth, N. J.

Application April 10, 1936, Serial No. 73,638

3 Claims. (Cl. 60—52)

This invention relates to marine steering apparatus, and more particularly to improvements in steering apparatus of the hydraulic type.

Heretofore, in marine steering gear, it has been the practice to operate a rudder arm by a pair of opposed hydraulic rams in which the operating fluid, usually oil, is circulated by a pump, and the admission and emission of the liquid to the cylinders of the rams is controlled by a by-pass device connected with liquid transmission pipes. There have been numerous improvements and modifications of this type of steering apparatus; but all of such improvements have included the use of two opposed rams.

It is an object of this invention to provide a marine steering apparatus in which the use of two opposed hydraulic rams is eliminated, thereby greatly decreasing the cost and weight of the apparatus, at the same time providing a simple and highly efficient steering device for ships and the like.

A further object is the provision of a steering apparatus of the hydraulic type in which a single cylinder is employed, the cylinder being movable over a stationary piston positioned therein, and an operating fluid is forced by means of a double-acting pump into the cylinder on both sides of the piston, the admission and emission of the fluid being controlled by by-pass valves which determine the side of the piston to receive the greatest force of fluid in order to move the cylinder in a desired direction, the cylinder being connected to the rudder arm of a ship or the like.

A further object is the provision of an operating mechanism employing a stationary piston positioned in a movable cylinder, and using a fluid as an operating means.

These and other advantageous objects, which will later appear are accomplished by the simple and practical construction and arrangement of parts hereinafter described and exhibited in the accompanying drawings, forming part hereof, and in which:

Fig. 1 is a plan view of a hydraulic steering apparatus embodying my invention,

Fig. 2 is a side elevational view of the apparatus,

Fig. 3 is a side elevational view of the movable cylinder, in section, and

Fig. 4 is a plan view of the movable cylinder, partially in section.

Referring to the drawings, the apparatus is shown to comprise a base 1 upon which are mounted brackets 2, supporting a pair of horizontal rods 3, slidably receiving arms 4 attached to a movable cylinder 5, in which is positioned a piston 6, provided on each side thereof with passages 7, communicating with fluid supply pipes 8 and 9, said pipes respectively passing through heads 10 and 11, which are attached to and movable with the cylinder 5.

Pipes 8 and 9 communicate with the emission side of a pump 12, the admission side of the pump communicating with a pipe 13, in which telescopes a pipe 14, attached to the head 10, see Fig. 4. Obviously, in order to prevent leaking of the operating fluid, which is usually oil, suitable packing is provided about pipes 14, 8 and 9.

The head 10 is provided with a passage 15 communicating with the section of the cylinder surrounding pipe 8, and a pipe 16 connects the section of the cylinder surrounding pipe 9 with the head 10.

Mounted in the head 10 are a pair of opposed valves 17 and 18, associated respectively with passage 15 and pipe 16. The valves 17 and 18 are spring controlled and normally tend to seat to prevent the flow of oil from passage 15 and passage 19, (which passage communicates with pipe 16) into a common chamber 20 opening into a passage 21 communicating with pipe 14. Small bleeder valves 22 are provided to take care of excess pressure due to rudder shocks or any other overload, the bleeder valves 22 opening into passages 23 communicating with passage 21.

Rotatably mounted in head 10 and passing through chamber 20 is a stub shaft 24 having integral therewith an arm 25 which engages the web-like stems 26 of valves 17 and 18 to hold them open when the arm is in the position shown in Fig. 4.

The shaft 24 has fixed to the lower end thereof a lever 27 pivoted at 28 to a bar 29 slidably mounted in arms 30 projecting from heads 10 and 11, (see Fig. 1). The lever 27 is also attached to a bar 31 supporting a pair of pulleys 32 and 33, over which pass cables 34 and 35, each of which have one end thereof attached to arms 36 projecting from the heads 10 and 11, and the other end connected with a hand wheel or other manually or automatically controlled device for steering (not shown).

Head 11 has connected thereto a pair of arms 37 pivotally connected to a forked rudder arm 38.

One of the arms 4 is provided with stops 39 and 40 adapted to engage lever 27 to limit swinging movement thereof.

Also projecting from heads 10 and 11 are arms 41, similar to arms 30, and slidably supporting a bar 42, the latter having a pair of stops 43 adapted to engage an arm 44 fixed to the upper end of shaft 24. Bars 29 and 42 are connected by short cables 45 and 46 to common cables 47 and 48, which lead to the hand wheel (not shown) for a purpose hereinafter described.

In operation, the pump 12, which can be operated by an electric motor or other suitable power means, constantly pumps oil through pipes 8 and 9 into the passages 7 in piston 6 and thence into sections of the cylinder 5 on both sides of the piston 6. When the arm 25 is in the position shown in Fig. 4, whereby valves 17 and 18 are both held open, the oil flows through passage 15 and pipe 16, through valves 17 and 18 and pipe 13, back to the pump 12. This substantially is a neutral position. When it is desired to turn the rudder to steer in a desired direction, the hand wheel is rotated, to tighten up on one of the cables 34 or 35. For example, when cable 34 is tightened, there is a pull on lever 27 to rotate shaft 24 to cause the arm 25 to hold valve 18 open and allow valve 17 to close. Now, the oil flows freely through the section of the cylinder 5 associated with pipe 16, but flow of oil is stopped through passage 15, thus building up pressure in the section of the cylinder receiving oil from pipe 8. Since the piston 6 is stationary, this building up of pressure causes the cylinder 5 to move to the left, moving the rudder arm 38 with it. When the rotation of the hand wheel has ceased, bar 31 becomes a fulcrum for lever 27, pivoting on bar 31. The lever 27 swings to the neutral position by the movement of the cylinder and automatically opens valve 17 to stop cylinder 5. The cylinder 5 and arm 38 will remain in the positions to which they have been moved until the lever 27 is moved again to close valve 18 and open valve 17 to cause pressure to build up in the section of the cylinder surrounding pipe 9 to cause the cylinder 5 to move in the opposite direction.

In the event of a failure of pump or other parts of the apparatus to operate properly, and it is desired to manually operate the rudder arm 38, the cables 47 or 48 are tightened to slide the bars 29 and 42 in one direction or the other. Assume that cable 47 is tightened, there will first be a pull on bar 29, because it is restrained by the lever 27. A pull on bar 29 will rotate lever 27 to open valve 17, after which the arm 44 will engage one of the stops 43 thus causing bars 29 and 42 to move together, and to move cylinder 5 and its associated parts to the right to move rudder 38 in the same direction. During the movement of the cylinder 5 the liquid in the cylinder is ejected through passage 15 and valve 17 into pipes 14 and 13 back to supply tank 12.

From the above description it will be seen that there has been provided a simple and effective hydraulic steering apparatus which eliminates the necessity of heavy opposed hydraulic rams. While the device has been described with reference to marine steering apparatus, it is obvious that it can be effectively employed in many other situations.

The foregoing disclosure is to be regarded as descriptive and illustrative only, and not as restrictive or limitative of the invention, of which obviously embodiments may be constructed including many modifications without departing from the general scope herein indicated and denoted in the appended claims.

Having thus described my invention, what I claim as new and desire to secure by Letters Patent, is:

1. In a marine steering apparatus of the hydraulic type, a stationary piston, a movable cylinder slidable over said piston, a pump, means for conveying oil from said pump to said cylinder on both sides of the piston, said piston having heads closing each end thereof, one of said heads having a chamber, means for conveying oil from said cylinder to said chamber, valves mounted in said head controlling the flow of oil into the chamber, means tending constantly to close said valves, means communicating with the chamber for conveying oil back to the pump, a stub shaft mounted in the chamber, an arm on said shaft adapted to engage and increase the opening of one of the valves and to allow the other valve to close, a lever fixed to said shaft, a bar fixed to one end of the lever, a pair of pulleys mounted on said bar, cables passing over the pulleys, each of said cables having one end thereof fixed to a part movable with the cylinder so that a pull upon one of the cables and a slackening upon the other will effect a movement of the lever to rotate the stub shaft to cause the arm to further open one of the valves and to allow the other valve to close, and arms mounted on the other head of the cylinder and pivotally connected to a rudder arm.

2. In a marine steering apparatus of the hydraulic type, a stationary piston, a movable cylinder slidable over said piston, a pump, means for conveying oil from said pump to said cylinder on both sides of the piston, said piston having heads closing each end thereof, one of said heads having a chamber, means for conveying oil from said cylinder to said chamber, valves mounted in said head controlling the flow of oil into the chamber, means tending constantly to close said valves, and means communicating with the chamber for conveying oil back to the pump, a stub shaft mounted in the chamber, an arm on said shaft adapted to engage and increase the opening of one of the valves and to allow the other valve to close, a lever fixed to said shaft, a bar fixed to one end of the lever, a pair of pulleys mounted on said bar, cables passing over the pulleys, each of said cables having one end thereof fixed to a part movable with the cylinder so that a pull upon one of the cables and a slackening upon the other will effect a movement of the lever to rotate the stub shaft to cause the arm to further open one of the valves and to allow the other valve to close, arms mounted on the other head of the cylinder and pivotally connected to a rudder arm, a pair of spaced bars slidably supported by the cylinder, cables connecting the ends of said bars, one of said bars being pivotally connected to said lever, spaced stops on the other bar, and an arm fixed to said stub shaft and adapted to engage one of said stops when the spaced bars are moved in the same direction.

3. In a marine steering apparatus of the hydraulic type, a movable cylinder, arms connecting said cylinder to a rudder arm, a stationary piston positioned in said cylinder and over which said cylinder slides, a pump for supplying an operating fluid to the cylinder on both sides of said piston, valve means for controlling the circulation and return of said operating fluid to the pump, a head for the cylinder, a stub shaft mounted in said head, an arm on said shaft adapted to engage and control the extent of opening of said valve, a lever fixed to said shaft, a bar fixed to one end of the lever, a pair of pulleys mounted on said bar, cables passing over the pulleys, each of said cables having one end thereof fixed to a part movable with the cylinder, so that a pull upon one of the cables and a slackening upon the other will effect a movement of the lever to rotate the stub shaft to cause the arm to change the extent of opening of said valves, and arms mounted on the other end of the cylinder pivotally connected to the rudder arm.

THOMAS McLEOD.